(12) United States Patent
Sudbrink et al.

(10) Patent No.: US 9,596,799 B2
(45) Date of Patent: Mar. 21, 2017

(54) DRAFT TUBE SEQUENCING FOR AN AGRICULTURAL TILLAGE IMPLEMENT

(71) Applicant: CNH Industrial America LLC, New Holland, PA (US)

(72) Inventors: Matthew R. Sudbrink, Metamora, IL (US); Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 308 days.

(21) Appl. No.: 14/528,535

(22) Filed: Oct. 30, 2014

(65) Prior Publication Data

US 2015/0156961 A1   Jun. 11, 2015

Related U.S. Application Data

(60) Provisional application No. 61/914,594, filed on Dec. 11, 2013.

(51) Int. Cl.

| A01B 73/02 | (2006.01) |
|---|---|
| A01B 73/06 | (2006.01) |
| A01B 59/00 | (2006.01) |
| A01B 73/04 | (2006.01) |

(52) U.S. Cl.
CPC ............ *A01B 73/02* (2013.01); *A01B 59/002* (2013.01); *A01B 73/044* (2013.01); *A01B 73/048* (2013.01); *A01B 73/065* (2013.01)

(58) Field of Classification Search
CPC ......... A01B 73/00; A01B 73/02; A01B 73/04; A01B 73/044; A01B 73/046; A01B 73/06
See application file for complete search history.

(56) References Cited

U.S. PATENT DOCUMENTS

| 2,713,296 A | 7/1955 | Silver et al. |
| 2,755,722 A | 7/1956 | Fraga |

(Continued)

FOREIGN PATENT DOCUMENTS

| GB | 1 269 041 | 3/1972 |
| GB | 1 500 179 | 2/1978 |

OTHER PUBLICATIONS

Eastman Industries Limited, Levelling, Stabilizer Arms, Draw Bar, Eye End, Turn Buckle, taken from http://www.eastmanfarmparts.com/levelling-stabilizer-arms-draw-bar1.html, May 6, 2013 (1 page).

*Primary Examiner* — Matthew D Troutman
(74) *Attorney, Agent, or Firm* — Rebecca L. Henkel; Rickard K. DeMille (57) ABSTRACT

An agricultural tillage implement including a main frame section having a pull hitch tube extending in a travel direction, which may be a telescoping pull hitch tube, a plurality of pivotally coupled wing sections coupled with the main frame section, and a plurality of pivoting wing front shank frames. Draft linkage assemblies connect the plurality of pivotally coupled wing sections to the telescoping pull hitch tube, while causing both the pivoting wing front shank frames and the plurality of pivotally coupled wing sections to articulate correctly. The main shank frame, the pivotal wing front shank frames, and the wing sections articulate from an operating configuration to a transport configuration.

20 Claims, 10 Drawing Sheets

(56) References Cited

U.S. PATENT DOCUMENTS

| | | | |
|---|---|---|---|
| 4,211,287 A * | 7/1980 | Garrison | A01B 73/067 172/311 |
| 4,223,743 A * | 9/1980 | Garrison | A01B 73/02 172/311 |
| 4,265,464 A | 5/1981 | Lange | |
| 4,492,272 A | 1/1985 | Jensen | |
| 4,564,073 A | 1/1986 | Ide et al. | |
| 4,703,810 A | 11/1987 | Meiners | |
| 4,778,194 A | 10/1988 | Koch et al. | |
| 5,462,123 A | 10/1995 | Harlan et al. | |
| 5,839,516 A | 11/1998 | Arnold et al. | |
| 6,131,669 A * | 10/2000 | Friggstad | A01B 63/32 172/311 |
| 6,192,994 B1 * | 2/2001 | Friggstad | A01B 63/32 172/311 |
| 6,202,756 B1 * | 3/2001 | Hundeby | A01B 63/32 172/311 |
| 6,205,937 B1 * | 3/2001 | Shoup | A01B 73/00 111/54 |
| 6,293,352 B1 * | 9/2001 | Hundeby | A01B 63/32 111/54 |
| 6,443,474 B1 | 9/2002 | Kay | |
| 6,550,543 B1 | 4/2003 | Friggstad | |
| 6,557,646 B1 | 5/2003 | Hurtis et al. | |
| 6,609,575 B1 | 8/2003 | Crabb | |
| 6,612,381 B2 | 9/2003 | Powell et al. | |
| 6,681,868 B2 | 1/2004 | Kovach et al. | |
| 6,708,775 B2 | 3/2004 | Beaujot | |
| 7,048,071 B1 | 5/2006 | Huenink et al. | |
| 8,020,629 B1 | 9/2011 | McFarlane et al. | |
| 8,047,299 B2 | 11/2011 | Hurtis et al. | |
| 8,235,133 B2 | 8/2012 | Friggstad | |
| 8,235,410 B2 | 8/2012 | Weber et al. | |
| 8,336,639 B2 | 12/2012 | Palen | |
| 2003/0150626 A1 | 8/2003 | Domries | |
| 2013/0068489 A1 | 3/2013 | Blunier et al. | |
| 2015/0150185 A1 * | 6/2015 | Houck | A01B 59/042 172/388 |

* cited by examiner

DRAFT TUBE SEQUENCING FOR AN AGRICULTURAL TILLAGE IMPLEMENT

CROSS REFERENCE TO RELATED APPLICATIONS

This is a non-provisional application based upon U.S. provisional patent application Ser. No. 61/914,594 entitled "TURNBUCKLE ADJUSTMENT FOR TILLAGE IMPLEMENT TRACKING", filed Dec. 11, 2013, which is incorporated herein by reference.

BACKGROUND OF THE INVENTION

1. Field of the Invention

The present invention relates to agricultural tillage implements, and, more particularly, to agricultural field cultivators.

2. Description of the Related Art

Farmers utilize a wide variety of agricultural tillage implements to prepare soil for planting. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

A field cultivator as described above may also include an optional rear auxiliary implement for finishing the seedbed for seeding. For example, a rear auxiliary implement may include a spike tooth harrow, spring tooth harrow, rolling (aka. crumbler) basket, etc., or any combination thereof.

As agricultural tillage implements become wider and wider over time, it becomes more difficult to keep the transport size of the implement within manageable limits. It also becomes more difficult to convert the agricultural tillage implement from an operating configuration to a transport configuration, or vice versa, without requiring too much time and difficulty on the part of the operator. It is desirable for the agricultural tillage implement to be converted from one mode to the other while the operator remains within the operator cab, through the use of hydraulics or other actuators. It is also desirable for the agricultural tillage implement to remain within certain geometric constraints so that it is not necessary to use a separate "escort vehicle" or the like when traveling on public roads.

SUMMARY OF THE INVENTION

The present invention provides an agricultural tillage implement with pivotally coupled wing sections that are foldable to a compact transport configuration.

The invention in one form is directed to an agricultural tillage implement including a main frame section having a pull hitch tube extending in a travel direction and a plurality of pivotally coupled wing sections coupled about generally vertical axes with the main frame section. The plurality of pivotally coupled wing sections can be pivoted forward about the generally vertical axes to positions adjacent to and generally parallel with the pull hitch tube when in the transport configuration, or may be pivoted outward about the generally vertical axes to positions perpendicular to the pull hitch tube when in the operating configuration. Each of the plurality of pivotally coupled wing sections has a wing front shank frame pivotally coupled to it, which wing front shank frame may be pivoted to a generally vertical position when in the transport configuration, or may be pivoted to a generally horizontal position when in the operating configuration. Stand-off brackets extend forward from the plurality of pivotally coupled wing sections. Pivoting swing arms are connected to the stand-off brackets, and are able to pivot inwards towards the plurality of pivotally coupled wing sections, or to pivot forwards towards the forward end of the pull hitch tube. Draft members are coupled to the pivoting swing arms and to the forward end of the pull hitch tube. A controller is provided for controlling the plurality of pivotally coupled wing sections, the wing front shank frames, and the pivoting swing arms. The controller is operable to reconfigure the agricultural tillage implement from the operating configuration to the transport configuration by going through a folding sequence of steps, including pivoting the wing front shank frames upwards, pivoting the pivoting swing arms inwards, and pivoting the plurality of pivotally coupled wing sections forwards.

The invention in another form is directed to a draft linkage assembly for an agricultural tillage implement. The draft linkage assembly has stand-off brackets attached to pivotally coupled wing sections of the agricultural tillage implement, which stand-off brackets extend forward from the pivotally coupled wing sections past a plurality of wing front shank frames which are pivotally attached to the pivotally coupled wing sections. Pivoting swing arms are connected to the stand-off brackets, and can be pivoted inwards towards the pivotally coupled wing sections, or pivoted forwards towards the front of the pull hitch tube which makes up part of the main frame of the agricultural tillage implement. Draft members are coupled to the pivoting swing arms and to the forward end of the pull hitch tube. A controller is provided for controlling the draft linkage assembly, which is operable to reconfigure the draft linkage assembly from the operating configuration to the transport configuration by going through a folding sequence of steps, including determining that the plurality of wing front shank frames are in a generally vertical position, pivoting the pivoting swing arms inwards towards the pivotally coupled wing sections, and allowing the pivotally coupled wing sections to pivot forward about generally vertical axes to positions adjacent to and generally parallel with the pull hitch tube.

The invention in yet another form is directed to a method of reconfiguring an agricultural tillage implement from an operating configuration to a transport configuration. The method of reconfiguring the agricultural tillage implement includes the steps of pivoting a plurality of wing front shank frames to generally vertical positions, pivoting swing arms inwards towards pivotally coupled wing sections that are pivotally coupled with a main frame section of the agricultural tillage implement about generally vertical axes and that are operable to pivot forward about the generally vertical axis to a position adjacent to and generally parallel with a telescoping pull hitch tube attached to the main frame section and that are further operable to pivot outward about the generally vertical axis to a position perpendicular to the telescoping pull hitch tube, and pivoting the pivotally coupled wing sections forward to the position adjacent to and generally parallel with the telescoping pull hitch tube.

An advantage of the present invention is that the agricultural tillage implement may be quickly and efficiently reconfigured from the operating configuration to the transport configuration.

Another advantage is that the transport configuration of the agricultural tillage implement is kept within manageable limits while still allowing for the desired width and functionality of the agricultural tillage implement when in the operating configuration.

Another advantage is that reconfiguring the agricultural tillage implement from operating configuration to transport configuration and vice versa is accomplished without excessive time and difficulty on the part of the operator, and without requiring the operator to exit the operator cab.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Referring now to the drawings, and more particularly to FIGS. 1 through 6, there is shown an embodiment of an agricultural tillage implement 10 of the present invention. In the illustrated embodiment, the agricultural tillage implement 10 is in the form of a field cultivator for tilling and finishing soil prior to seeding.

Agricultural tillage implement 10 is configured as a multi-section field cultivator, and includes a main frame section 12 and a plurality of pivotally coupled wing sections 14A, 14B, 16A, 16B, 18A, and 18B. The left pivotally coupled wing sections are designated 14A, 16A and 18A, and the right pivotally coupled wing sections are designated 14B, 16B and 18B. Pivotally coupled wing sections 14A and 14B are each inner pivotally coupled wing sections, pivotally coupled wing sections 16A and 16B are each middle pivotally coupled wing sections, and pivotally coupled wing sections 18A and 18B are each outer pivotally coupled wing sections. Each pivotally coupled wing section 14A, 14B, 16A, 16B, 18A, and 18B may be provided with a tool bar segment, so that left inner pivotally coupled wing section 14A is provided with left inner tool bar segment 24A, right inner pivotally coupled wing section 14B is provided with right inner tool bar segment 24B, left middle pivotally coupled wing section 16A is provided with left middle tool bar segment 24C, right middle pivotally coupled wing section 16B is provided with right middle tool bar segment 24D, left outer pivotally coupled wing section 18A is provided with left outer tool bar segment 24E, and right outer pivotally coupled wing section 18B is provided with right outer tool bar segment 24F. Intermediate wings 13A and 13B may be attached to main frame section 12, and may provide generally vertical axes 86 and 88 about which the plurality of segmented wing sections 14A, 14B, 16A, 16B, 18A, and 18B pivot.

Main frame section 12 is the center section that is directly towed by a traction unit, such as an agricultural tractor (not shown). Main frame section 12 includes a pull hitch tube 20, which may be a telescoping pull hitch tube 20, including a forward end 20A and a rearward end 20B, extending in a travel direction 22, and a tool bar 24 which is coupled with and extends transverse to pull hitch tube 20. Reinforcing gusset plates 26 may be used to strengthen the connection between pull hitch tube 20 and tool bar 24. Main frame section 12 generally functions to carry a main shank frame 28 for tilling the soil, and a main rear auxiliary implement 30 for finishing the soil. Main rear auxiliary implement 30 includes a spring tooth drag 32 and a rolling (aka, crumbler) basket 34 which coact with each other to finish the soil. However, main rear auxiliary implement 30 can be differently configured, such as a spike tooth drag, cultivator shanks, etc.

Figure 4:
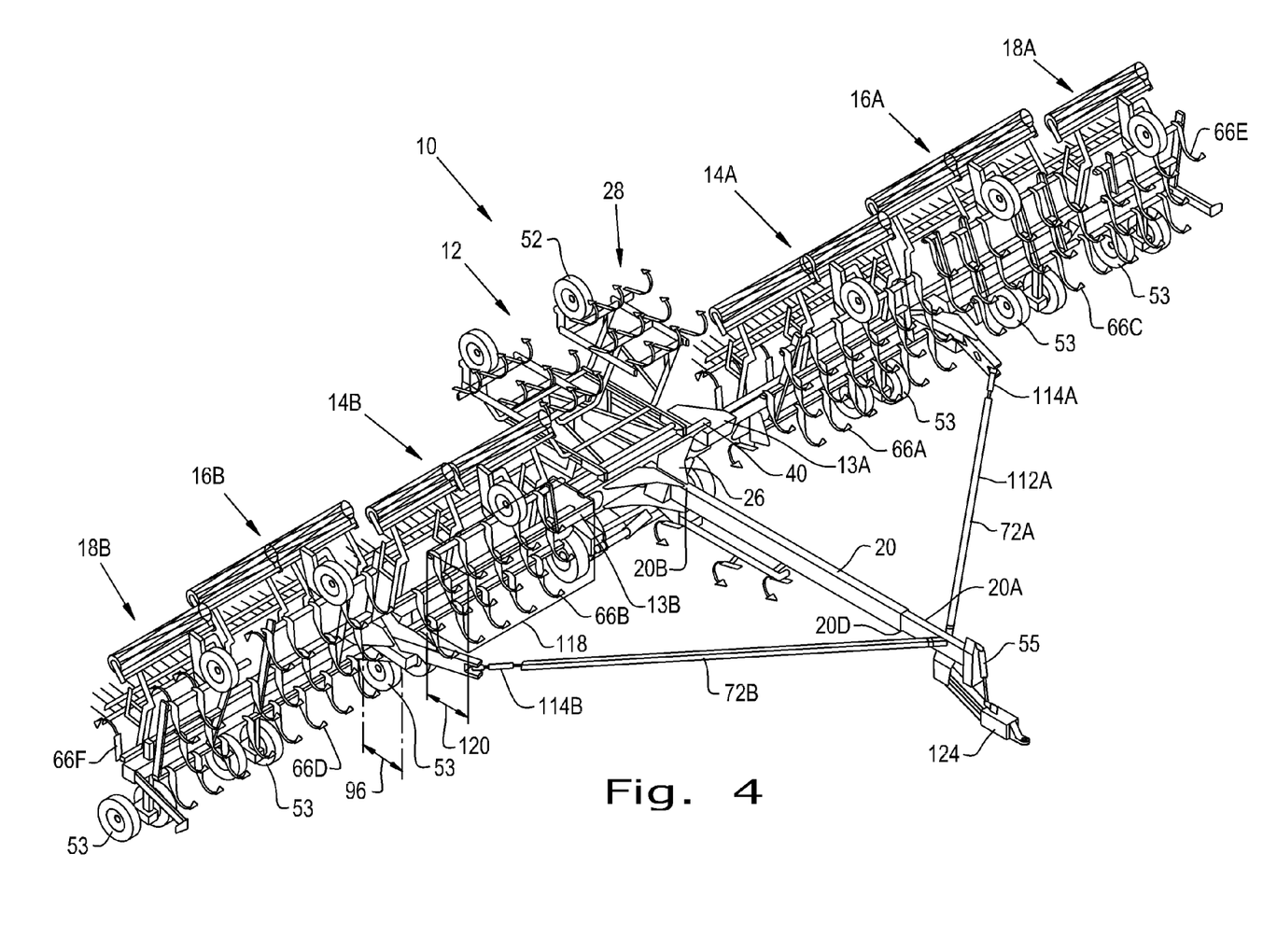
FIG. 4 is a top perspective view of the agricultural tillage implement shown in FIGS. 1-3, with the main shank frame folded rearward to a transport configuration and the wing front shank frames and wing section rear auxiliary implements folded upwards to a transport configuration.

Main shank frame 28 generally functions to carry cultivator shanks 36 with shovels 38 at their lower ends for tilling the soil. Main shank frame 28 is pivotally coupled with tool bar 24, preferably at the top of tool bar 24, such as with couplings 40. Main shank frame 28 is positioned in front of the tool bar 24 when in an operating configuration (FIGS. 1 and 3), and is foldable up and over the tool bar 24 to a position rearward of tool bar 24 when in a transport configuration (FIGS. 2 and 4). Main shank frame 28 includes two sets of longitudinal frame members 42 which are pivotally coupled with tool bar 24 at one end thereof using couplings 40.

A plurality of cross frame members 44 are coupled with the longitudinal frame members 42. Each of the cross frame members 44 have a pair of opposite outboard ends 46 which extend horizontally past longitudinal frame members 42, then in a downwardly angled direction, whereby the outboard ends 46 are positioned on opposite lateral sides of the pull hitch tube 20 when in an operating configuration. The outboard ends 46 of cross frame members 44 are coupled with a pair of respective main shank sub-frames, including left main shank sub-frame 48A and right main shank sub-frame 48B. Main shank sub-frames 48A and 48B are spaced apart from each other in a direction transverse to pull hitch tube 20 and are positioned on respective opposite lateral sides of pull hitch tube 20 when in an operating configuration.

A center shank sub-frame 50 is attached to and positioned below pull hitch tube 20. Since main shank sub-frames 48A and 48B are spaced apart on either side of pull hitch tube 20, center shank sub-frame 50 functions to till the soil in the intermediate open space between the two main shank sub-frames 48A and 48B. Center shank sub-frame 50 includes a number of cultivator shanks 36 and corresponding shovels 38; three in the illustrated embodiment. Center shank sub-frame 50 may be raised up and down with the raising and lowering of the main frame section 12 using rear lift wheels 52 using hydraulic cylinder 54 and using hydraulic cylinder 55 connected to pull hitch 124. Alternately, center shank sub-frame 50 may be raised or lowered independently of main frame section 12.

Main shank frame 28 also includes one or more gauge wheel assemblies 56 which function to level main shank sub-frames 48. In the illustrated embodiment, main shank frame 28 includes two gauge wheel assemblies 56 which are respectively coupled with a front of a respective main shank sub-frame 48A or 48B. A main shank frame hydraulic cylinder 58 is used to fold main shank frame 28 from the operating configuration to the transport configuration, and vice versa. Main shank frame hydraulic cylinder 58 may optionally be placed in a "float mode" such that gauge wheel assemblies 56 are operable to float up and down as they traverse across a field and thereby set the operating depth at the front edge of main shank frame 28.

Main shank frame 28 may also include additional support frame members 60 and 62 which provide structural rigidity. Support frame members 60 extend diagonally across the top of main shank frame 28, and support frame members 62 extend diagonally between the outboard ends 46 of cross frame members 44.

During use, it is periodically necessary to move the agricultural tillage implement 10 from an unfolded (operating) configuration to a folded (transport) configuration. Rear lift wheel hydraulic cylinder 54 may first be actuated to lift the main frame section 12 to the raised transport configuration using rear lift wheels 52 in cooperation with hydraulic cylinder 55 connected to pull hitch 124. Center shank sub-frame 50 may then be independently moved to a raised position if agricultural tillage implement 10 is provided with an independently movable center shank sub-frame 50. Toolbar lift wheels 53 lift wing sections 14A, 14B, 16A, 16B, 18A, and 18B to the raised transport position along with main frame section 12, which toolbar lift wheels 53 are then allowed to caster or pivot. Main shank frame hydraulic cylinder 58 is then actuated to fold main shank frame 28 up and over tool bar 24 to an inverted position rearward of tool bar 24 (FIGS. 2 and 4). Crumbler basket 34 of main rear auxiliary implement 30 may then also be moved to a raised position.

Then left inner wing front shank frame 66A, right inner wing front shank frame 66B, left middle wing front shank frame 66C, right middle wing front shank frame 66D, left outer wing front shank frame 66E, and right outer wing front shank frame 66F of the pivotally coupled wing sections 14A, 14B, 16A, 16B, 18A, and 18B are folded upwards to a generally vertical position using wing front shank frame hydraulic cylinders 68 and are locked in the generally vertical position. Wing front shank frames 66A, 66B, 66C, 66D, 66E, and 66F of the pivotally coupled wing sections 14A, 14B, 16A, 16B, 18A, and 18B may be folded upwards to the generally vertical position at the same time, or may be folded upwards to the generally vertical position sequentially.

Left inner wing section rear auxiliary implement 78A, right inner wing section rear auxiliary implement 78B, left middle wing section rear auxiliary implement 78C, right middle wing section rear auxiliary implement 78D, left outer wing section rear auxiliary implement 78E, and right outer wing section rear auxiliary implement 78F, each of which may include spring tooth drags, crumbler baskets, spike tooth drags, cultivator shanks, or any combination thereof, may then also be folded upwards to a generally vertical position and are locked in the generally vertical position. Wing section rear auxiliary implements 78A, 78B, 78C, 78D, 78E, and 78F may also be folded upwards to a generally vertical position at the same time, or may be folded upwards to the generally vertical position sequentially. Further, crumbler basket 34 of main rear auxiliary implement 30 may be moved to its raised position at the same time that wing section rear auxiliary implements 78A, 78B, 78C, 78D, 78E, and 78F are folded upwards to their generally vertical positions.

Figure 5:
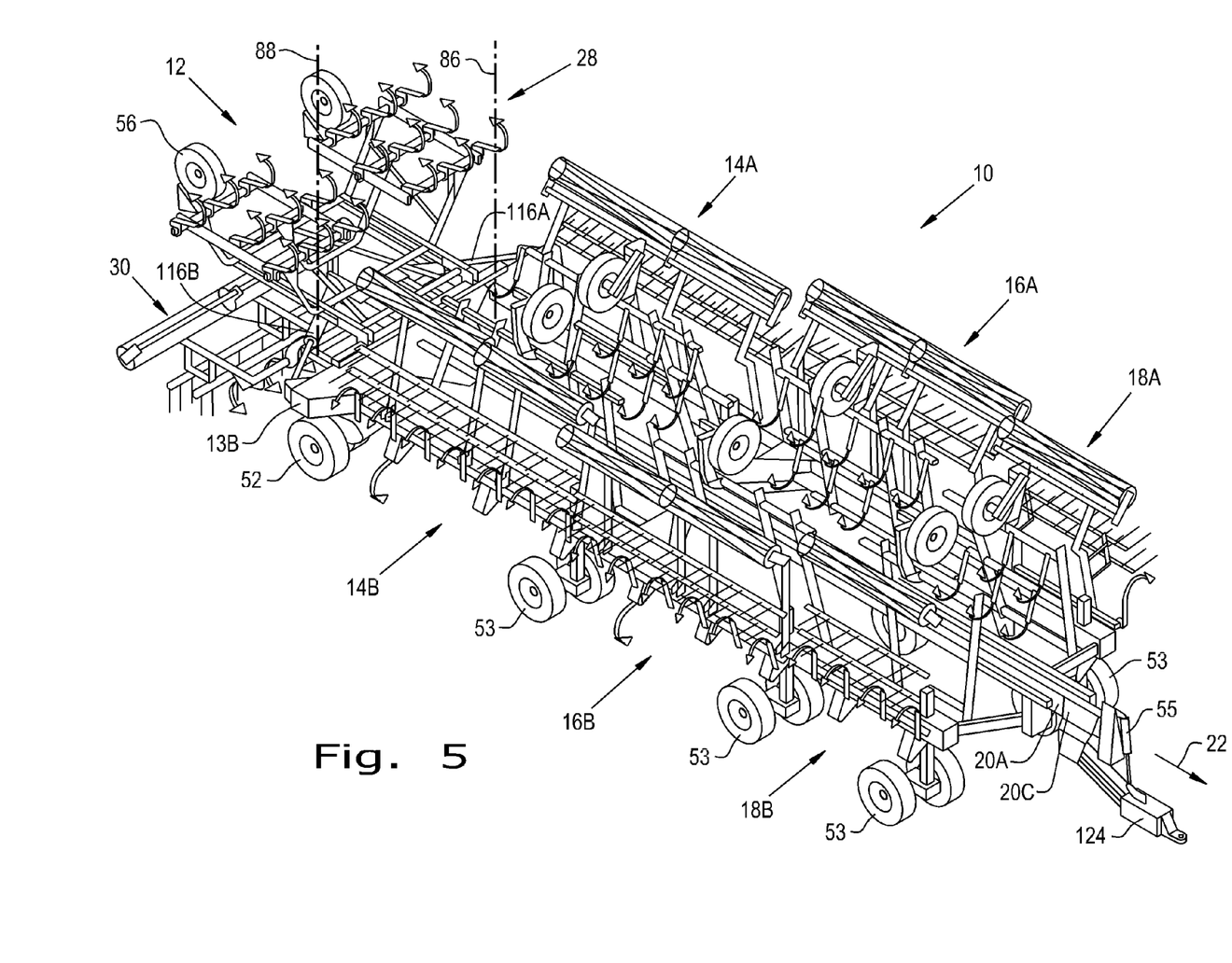
FIG. 5 is a top perspective view of the agricultural tillage implement shown in FIGS. 1-4, with the pivotally coupled wing sections folded forward to a transport configuration.
Figure 6:
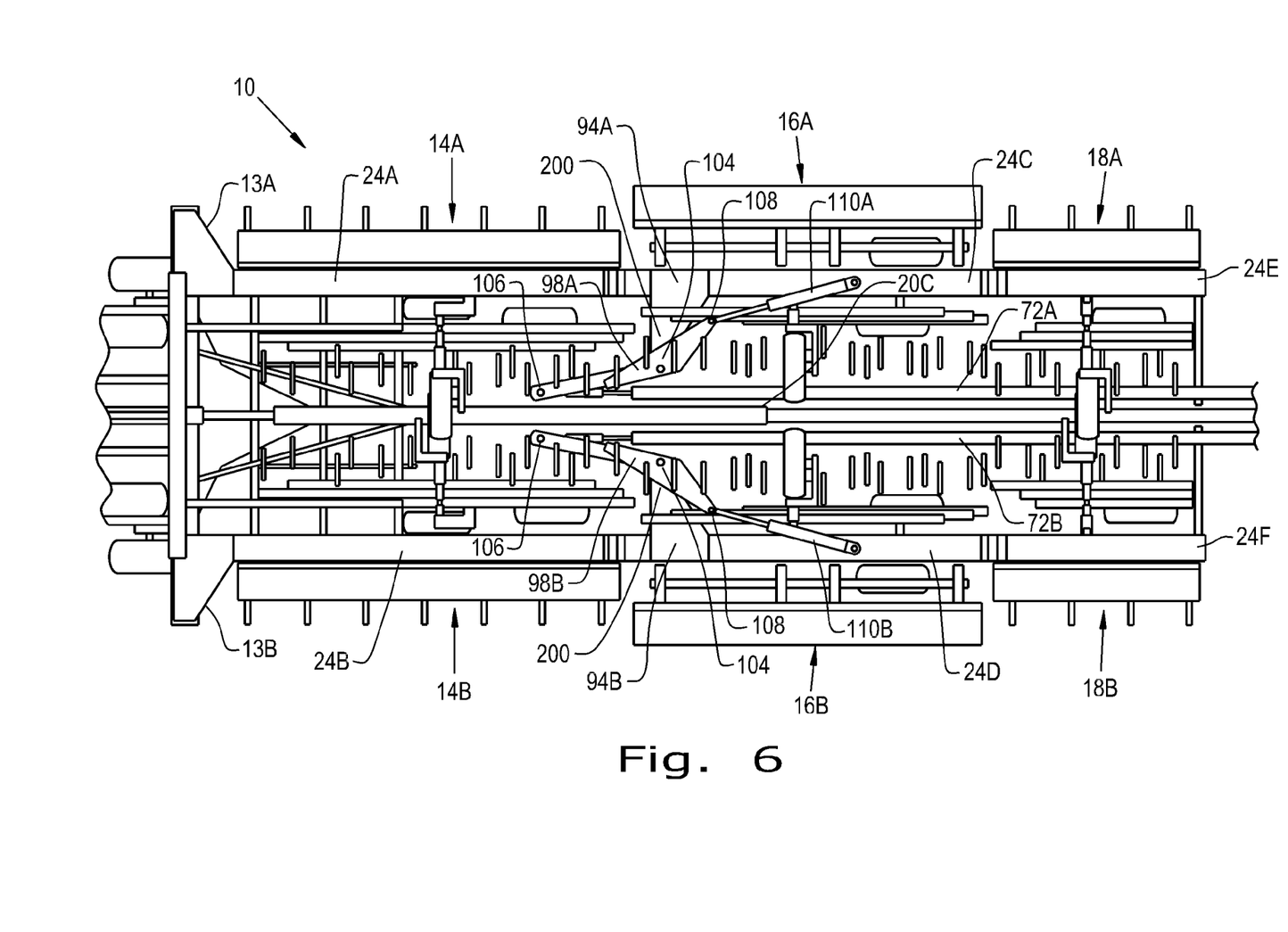
FIG. 6 is a top view of the agricultural tillage implement shown in FIGS. 1-4, with the pivotally coupled wing sections folded forward to a transport configuration.

Pivoting swing arms 98A and 98B of draft members 72A and 72B extending between the forward end 20A of pull hitch tube 20 and the pair of middle pivotally coupled wing sections 16A and 16B are then folded inward, and pivotally coupled wing sections 14A, 14B, 16A, 16B, 18A, and 18B are then folded forward by left main fold hydraulic cylinder 116A and right main fold hydraulic cylinder 116B about generally vertical axes 86 and 88 which pass through intermediate wings 13A and 13B to a position adjacent to and generally parallel with pull hitch tube 20 (FIG. 5). Pull hitch tube 20 may be a telescoping pull hitch tube 20, in which arrangement the draft members 72A and 72B extend between the telescoping forward end 20A of the telescoping pull hitch tube 20, which extends 20C as pivotally coupled wing sections 14A, 14B, 16A, 16B, 18A, and 18B pivot forward about generally vertical axes 86 and 88, and contracts 20D as pivotally coupled wing sections 14A, 14B, 16A, 16B, 18A, and 18B pivot outward about generally vertical axes 86 and 88. Gauge wheel assemblies 56 at the front of main shank frame 28 and gauge wheel assemblies 70 at the front of pivotally coupled wing sections 14A, 14B, 16A, 16B, 18A, and 18B are all configured as caster wheels and are not in contact with the ground when agricultural tillage implement 10 is in the folded or transport configuration. For unfolding the agricultural tillage implement 10 to the operating configuration, the reverse folding sequence is carried out.

Figure 7:
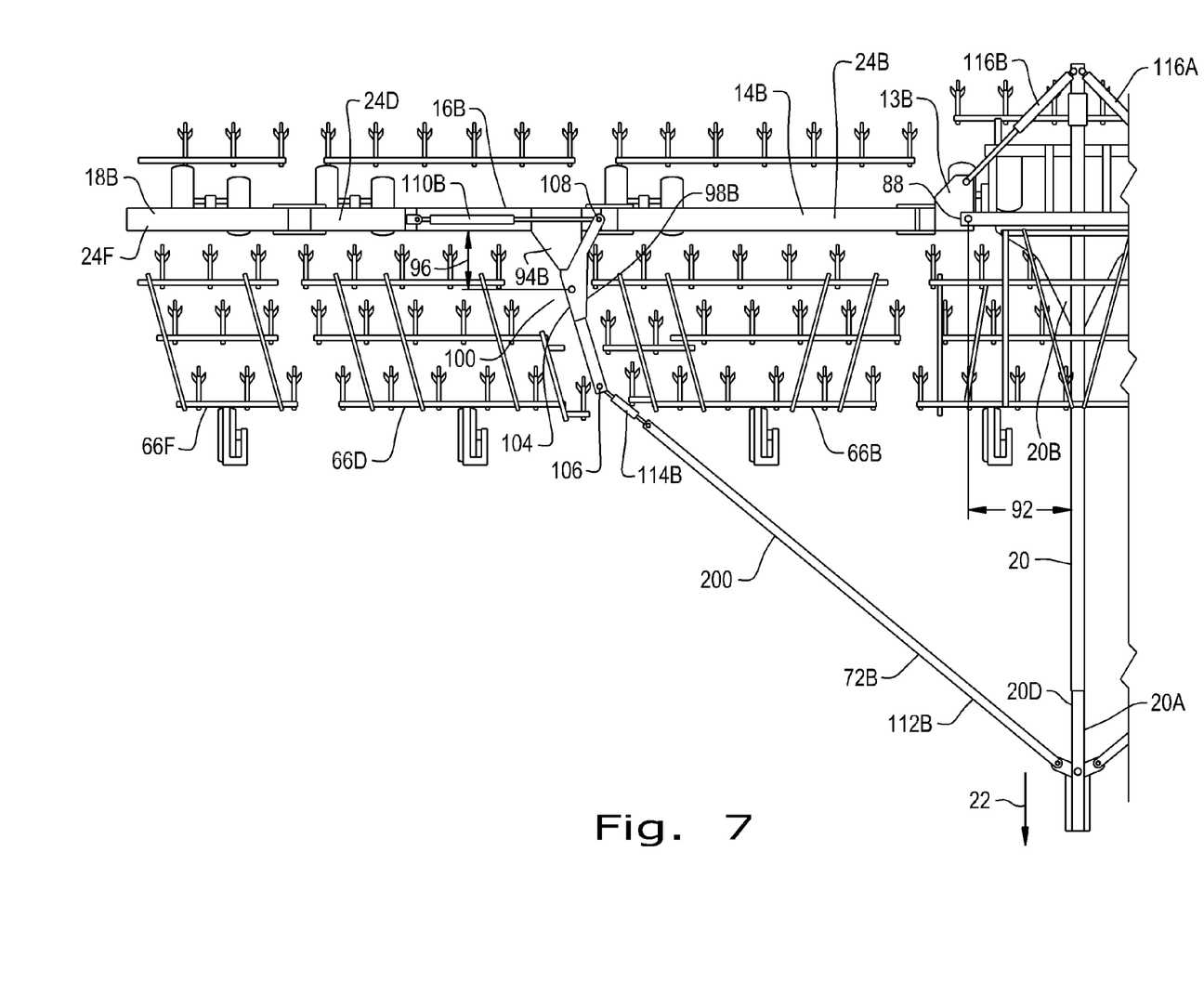
FIG. 7 is a top view of the agricultural tillage implement showing additional detail of the draft linkage assembly.

Looking now to FIG. 7, draft linkage assembly 200, of which right draft member 72B is a part, is shown in more specific detail. A standoff bracket 94, in this embodiment right standoff bracket 94B, extends forward from right middle pivotally coupled wing section 16B, though such right standoff bracket 94B could also be attached to right inner pivotally coupled wing section 14B or right outer pivotally coupled wing section 18B. The distance to which right standoff bracket 94B extends forward of right middle pivotally coupled wing section 16B, shown here as reference character 96, is less than the distance shown as reference character 92, which is the lateral distance between the right generally vertical axis 88 about which the pivotally coupled wing section 14B, 16B, and 18B pivots and the telescoping pull hitch tube 20 of the main frame section 12. In this way, right standoff bracket 94B, and draft linkage assembly 200 in general, does not interfere with telescoping pull hitch tube 20 of main frame section 12 when right main fold hydraulic cylinder 116B folds pivotally coupled wing section 14B, 16B, and 18B into the transport configuration. Note that right main fold hydraulic cylinder 116B is shown in a rear mounted configuration, acting on intermediate wing 13B of pivotally coupled wing section 14B, 16B, and 18B directly. It is also contemplated that right main fold hydraulic cylinder 116 may be mounted longitudinally on telescoping pull hitch tube 20, causing extending telescoping pull hitch tube 20 to pull pivotally coupled wing sections 14B, 16B, and 18B into the transport configuration by action of the draft linkage assembly 200.

Figure 8:
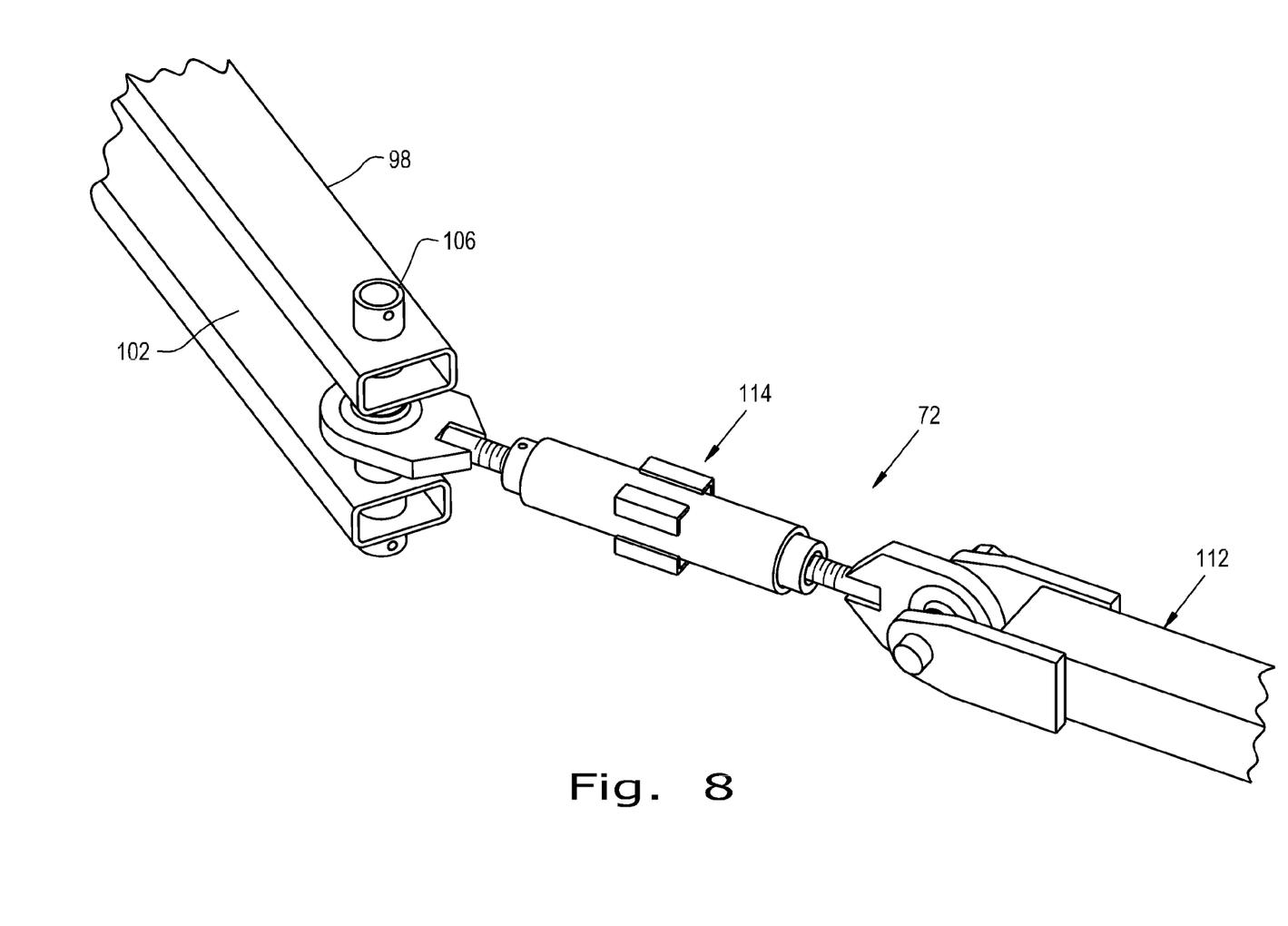
FIG. 8 is a detail view of the draft member.

Draft linkage assembly 200 is further provided with right pivoting swing arm 98B, which is configured as a bell crank arrangement 100. Bell crank arrangement 100 has a pivoting swing arm center pivot 104, which is connected to the right standoff bracket 94B, as well as a pivoting swing arm second pivot 106, which is connected to the right draft member 72B. A pivoting swing arm third pivot 108 is connected to a right pivoting swing arm hydraulic cylinder 110B, which serves to rotate right pivoting swing arm 98B inwards toward right inner pivotally coupled wing section 14B upon contraction, and serves to rotate right pivoting swing arm 98B forwards towards pull hitch tube forward end 20A upon extension. Right pivoting swing arm 98B may be provided with a pivoting swing arm recess 102 (see FIGS. 1, 2, and 8), which allows it to nest with right draft member 72B when in the folded configuration, as explained further below.

Note that draft linkage assembly 200 as shown in FIG. 7 has right pivoting swing arm hydraulic cylinder 110B located outwards along right middle pivotally coupled wing section 16B from right standoff bracket 94B. An alternate embodiment would place right pivoting swing arm hydraulic cylinder 110B inwards along right middle pivotally coupled wing section 16B from right standoff bracket 94B, such that right pivoting swing arm hydraulic cylinder 110B would cause right pivoting swing arm 98B to pivot inwards toward right inner pivotally coupled wing section 14B upon extension, and forwards towards pull hitch tube forward end 20A upon contraction.

Figure 1:
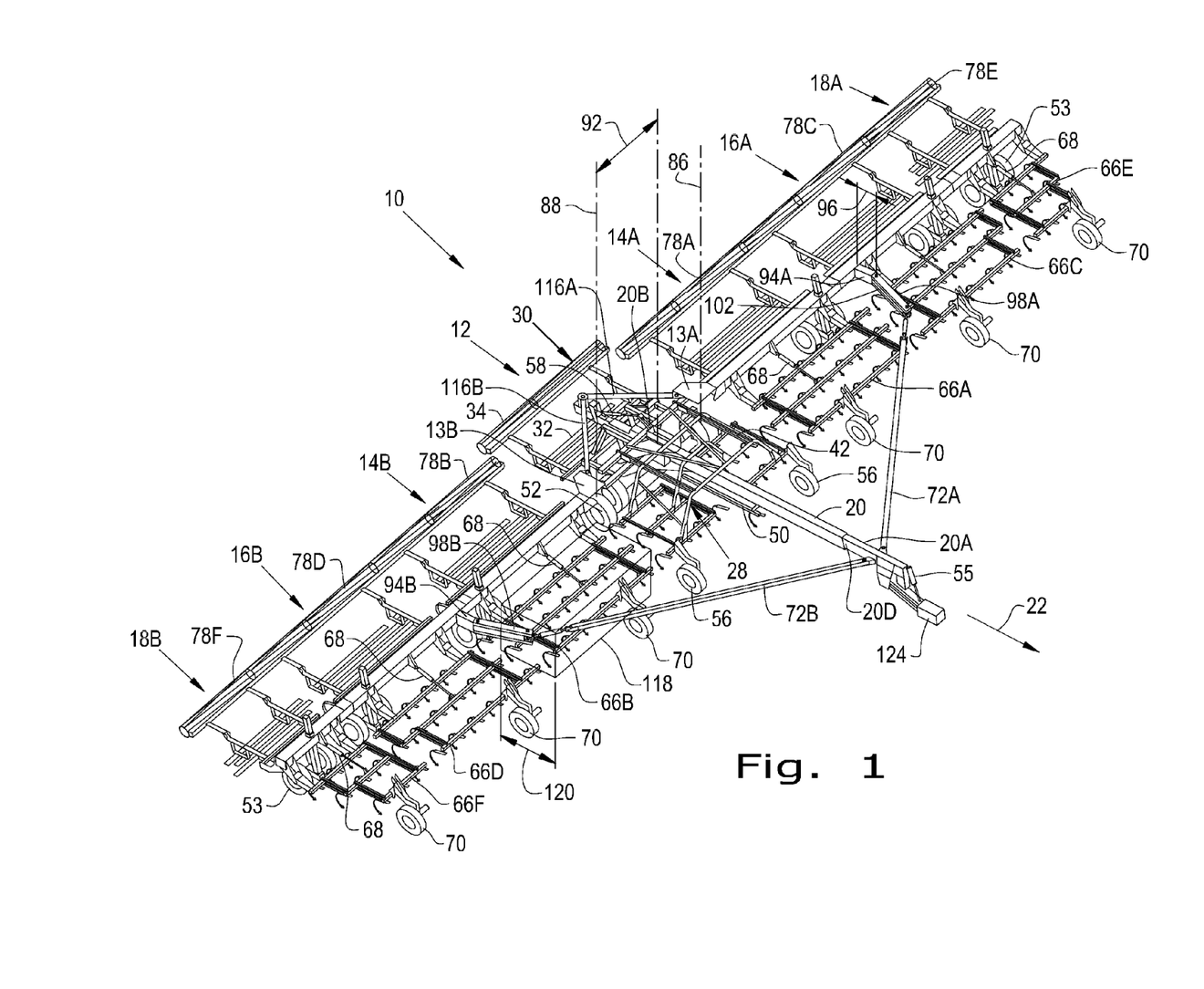
FIG. 1 is a top perspective view of an embodiment of an agricultural tillage implement of the present invention, in the form of a field cultivator.
Figure 2:
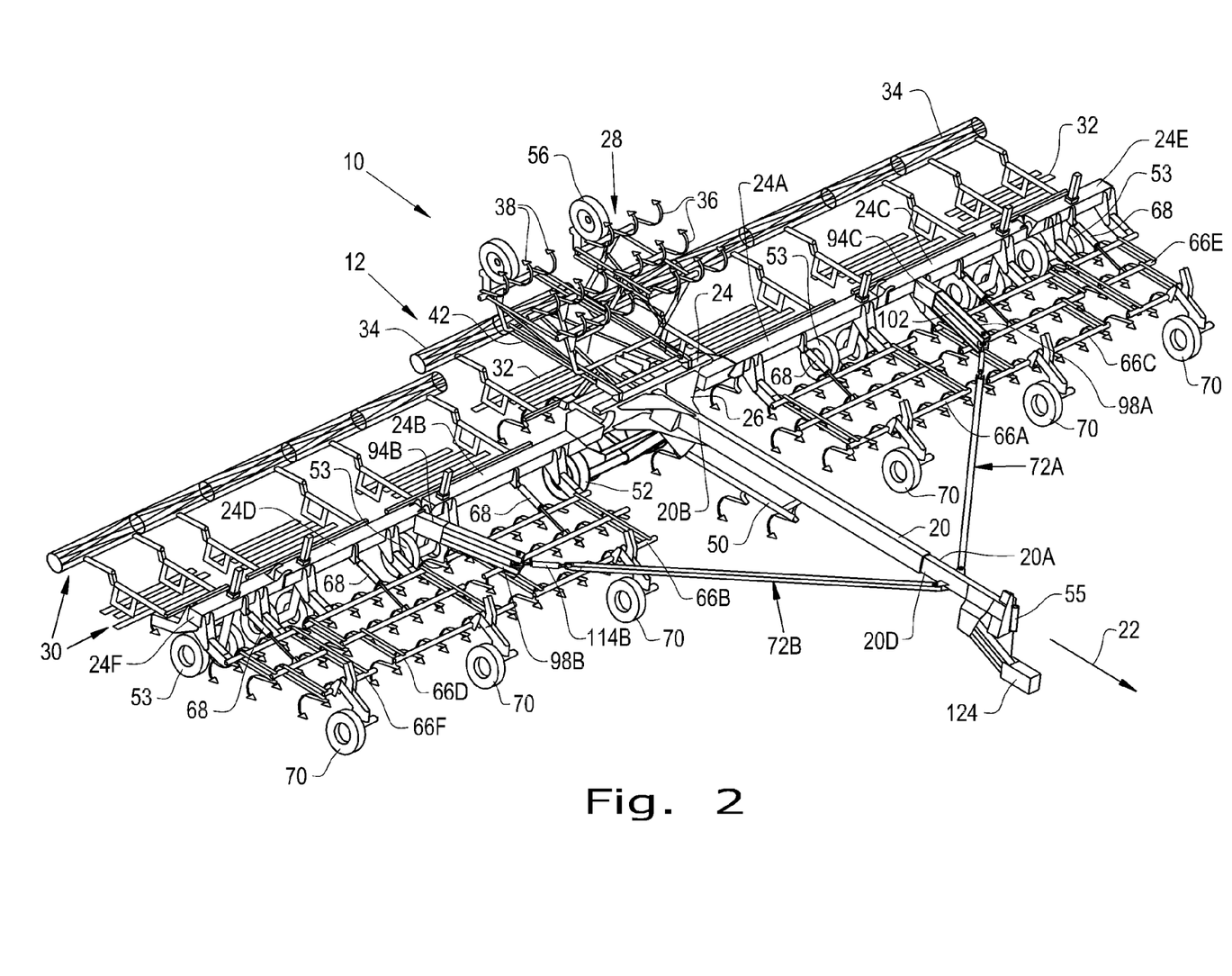
FIG. 2 is the same top perspective view shown in FIG. 1, with the main shank frame folded to a transport configuration.
Figure 3:
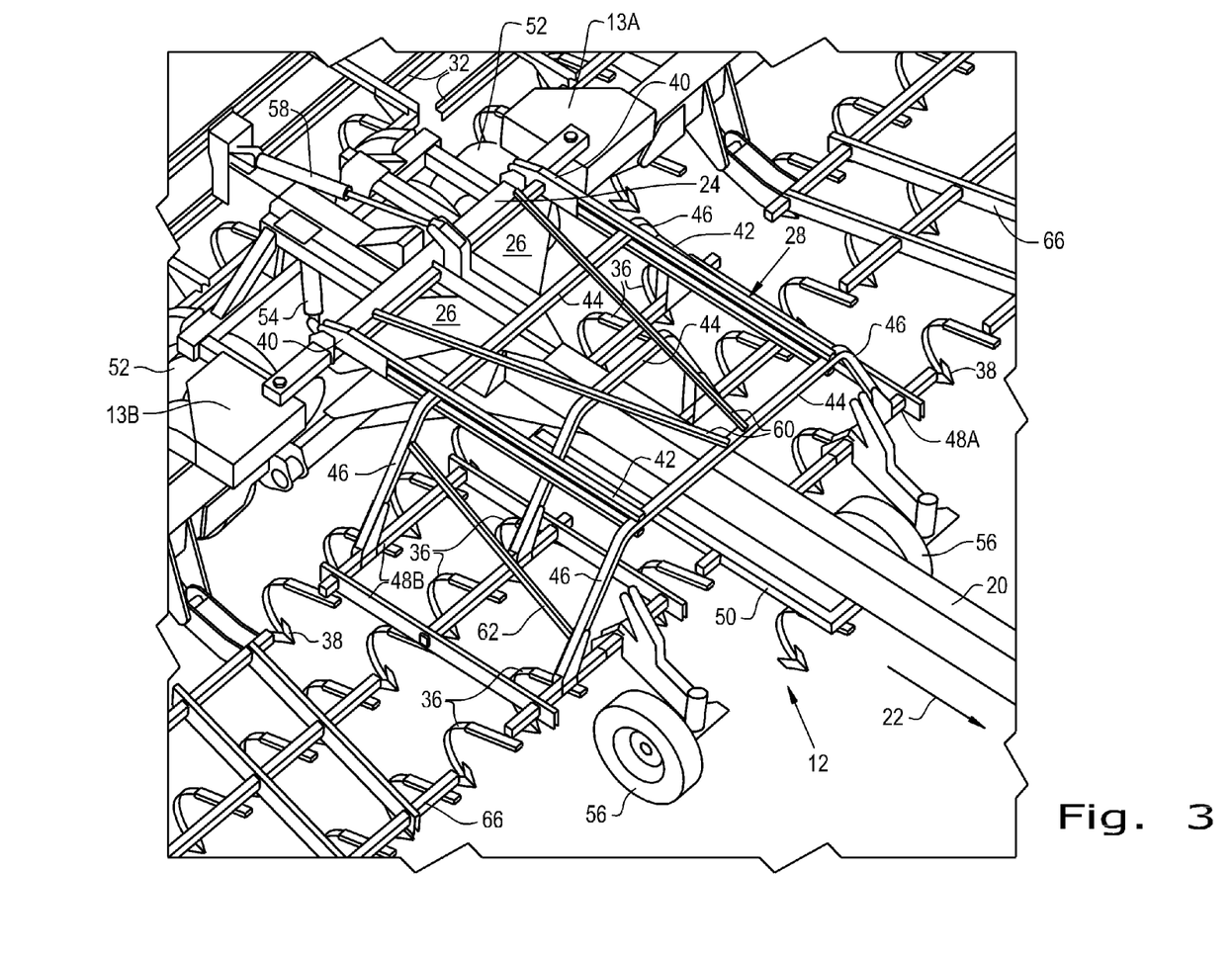
FIG. 3 is a top perspective view of the center frame section with the main shank frame in the operating configuration.

Right standoff bracket 94B extends sufficiently forward from right middle pivotally coupled wing section 16B so that when wing front shank frames 66A, 66B, 66C, 66D, 66E, and 66F, shown here as right wing front shank frames 66B, 66D, and 66F, are rotated to their generally vertical positions, right standoff bracket 94B extends beyond longitudinal length 120 of the space 118 forward of the pivotally coupled wing sections 14B, 16B, and 18B occupied by the wing front shank frames 66A, 66B, 66C, 66D, 66E, and 66F (see FIGS. 1 and 4). In this way, right pivoting swing arm 98B does not interfere with wing front shank frame 66B when right pivoting swing arm 98B pivots inwards towards right inner pivotally coupled wing section 14B. Pivoting right pivoting swing arm 98B inwards towards right inner pivotally coupled wing section 14B allows pivotally coupled wing sections 14B, 16B, and 18B to fold to the transport configuration as right draft member 72B nests with pivoting swing arm recess 102, whereas pivoting right pivoting swing arm 98B forwards towards pull hitch tube forward end 20A allows pivotally coupled wing sections 14B, 16B, and 18B to unfold to the operating configuration while still allowing right inner wing shank frame 66B to pivot to the generally horizontal position.

Right draft member 72B may have a right draft tube 112B and a right turnbuckle 114B arranged so that right turn-buckle 114B may be used to adjust the angle of pivotally coupled wing sections 14B, 16B, and 18B when in the position perpendicular to the pull hitch tube 20 in the operating configuration, in order to provide for proper tracking of the agricultural tillage implement 10. It must of course be appreciated that the draft linkage assembly 200 shown in FIG. 7 is shown in a right hand embodiment, and that the agricultural tillage implement may be possessed of a left hand embodiment, including left draft member 72A, left standoff bracket 94A, left pivoting swing arm 98A, left pivoting swing arm hydraulic cylinder 110A, left draft tube 112A, and left turnbuckle 114A, all symmetrically opposite to the draft linkage assembly 200 shown in FIG. 7. Further, the agricultural tillage implement may be possessed of both left and right hand draft linkage assemblies 200.

Figure 9:
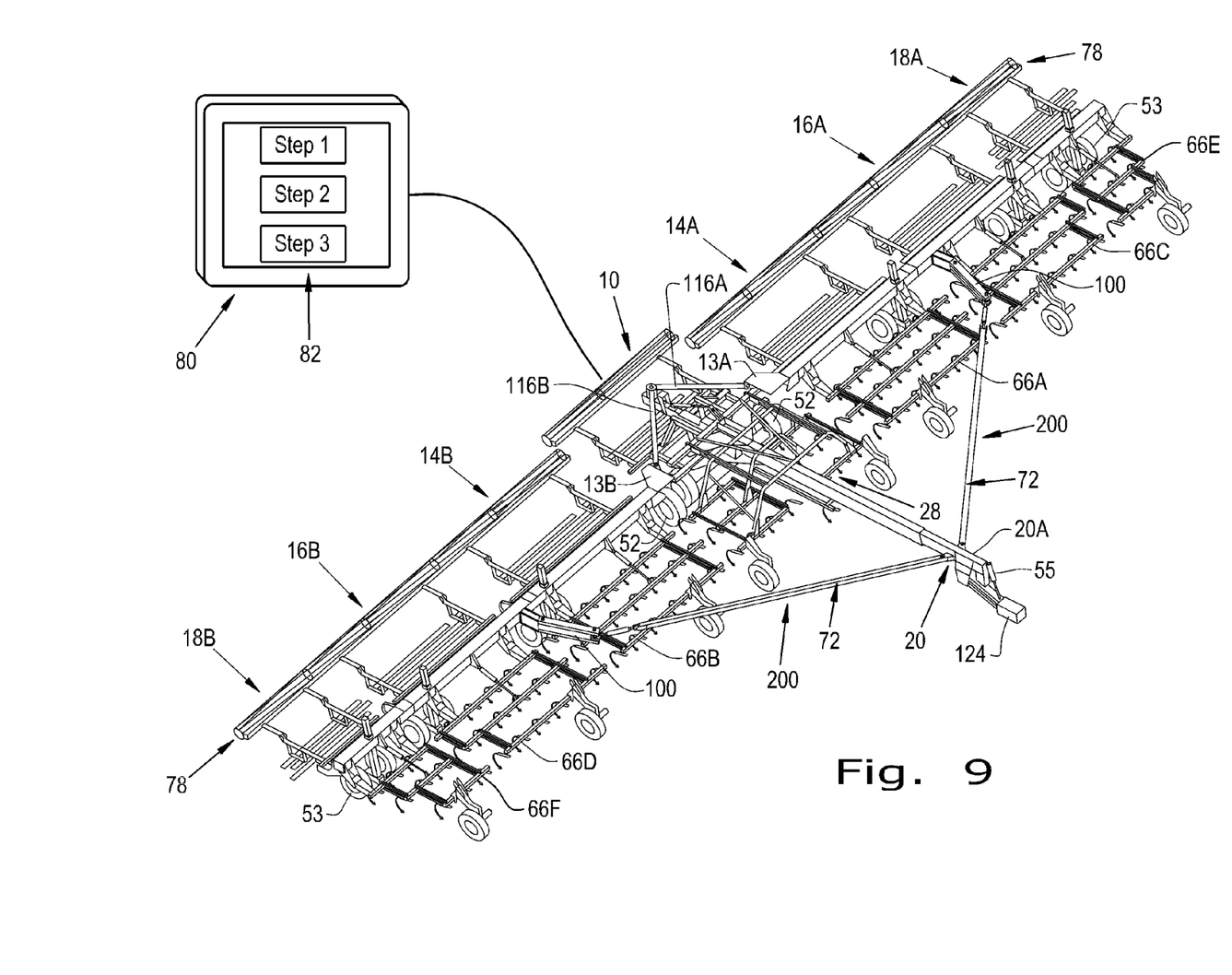
FIG. 9 is an illustration of a controller for controlling the agricultural tillage implement in an embodiment of a sequence screen, the controller being linked to the hydraulic cylinders of the agricultural tillage implement.

FIG. 9 shows a controller 80 for controlling the agricultural tillage implement, embodied in the form of a sequence screen 82, which controller 80 is linked to the agricultural tillage implement's hydraulic cylinders 54, 58, 68, 110, and 116 (not all shown in FIG. 9). The controller 80 may be an electrical processing circuit (EPC), which EPC may be configured as any type of suitable processor, such as a digital controller, an analog processor, hardwired components, or an application specific integrated circuit (ASIC). Alternately, the controller 80 may be generally hydraulic in nature, such as a valve body or series of hydraulic valves, with the sequence screen directly controlling solenoid valves. The sequence screen 82 prompts an operator of the agricultural tillage implement to take the folding sequence of steps in order to reconfigure the agricultural tillage implement from the operating configuration to the transport configuration, or the unfolding sequence of steps in order to reconfigure the agricultural tillage implement from the transport configuration to the operating configuration, as described previously. The sequence screen 82 embodiment of the controller 80 may make each of the steps of the folding or unfolding sequence of steps available to the operator of the agricultural tillage implement only upon completion of the previous step. The controller 80 embodied in the form of a sequence screen 82 may determine successful initiation and completion of each of the steps using limit switches, proximity sensors, or hydraulic pressure sensors.

Figure 10:
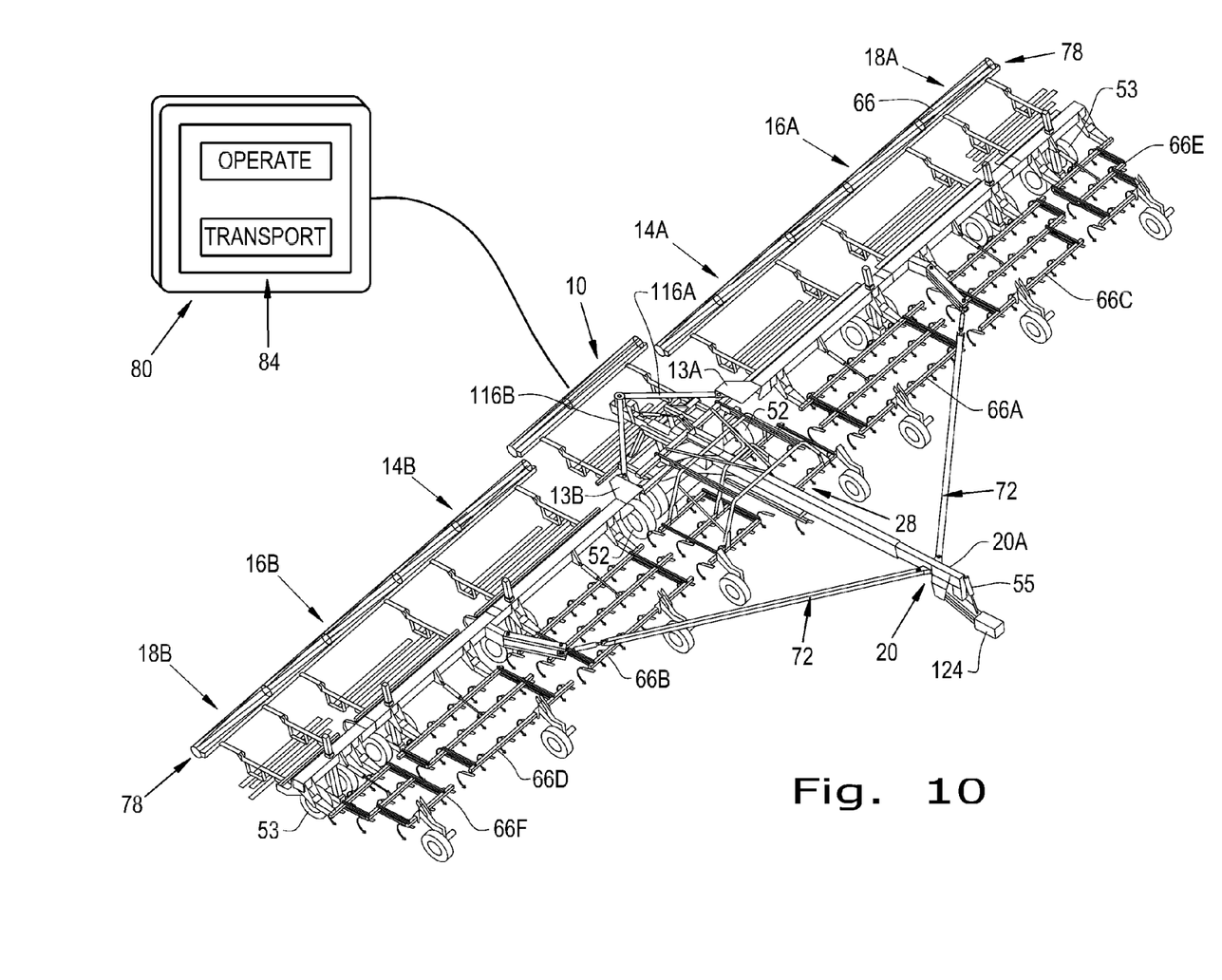
FIG. 10 is another illustration of a controller for controlling the agricultural tillage implement, in an embodiment of an automated control device, the controller being linked to the hydraulic cylinders of the agricultural tillage implement.

FIG. 10 shows another controller 80 for controlling the agricultural tillage implement, embodied in the form of an automated control device 84, which controller 80 is also linked to the agricultural tillage implement's hydraulic cylinders 54, 58, 68, 110, and 116 (not all shown in FIG. 10). The automated control device 84 automatically takes the folding sequence of steps in order to reconfigure the agricultural tillage implement from the operating configuration to the transport configuration, or the unfolding sequence of steps in order to reconfigure the agricultural tillage implement from the transport configuration to the operating configuration, as described previously, upon prompting by the operator of the agricultural tillage implement. Similar to the controller 80 embodied in the form of a sequence screen 82, the controller 80 embodied in the form of an automated control device 84 may also determine successful initiation and completion of each of the steps using limit switches, proximity sensors, or hydraulic pressure sensors.

To prevent improper operation of the agricultural tillage implement 10, including the sequence of pivoting the plurality of pivotally coupled wing sections 14A, 14B, 16A, 16B, 18A, and 18B forward about the generally vertical axes 86 and 88 to the position adjacent to and generally parallel with the pull hitch tube 20 when changing to the transport configuration or pivoting the plurality of pivotally coupled wing sections 14A, 14B, 16A, 16B, 18A, and 18B outward about the generally vertical axes 86 and 88 to the position perpendicular to the pull hitch tube 20 when changing to the operating configuration, pivoting the wing front shank frames 66A, 66B, 66C, 66D, 66E, and 66F to the generally vertical position when changing to the transport configuration or pivoting the wing front shank frames 66A, 66B, 66C, 66D, 66E, and 66F to the generally horizontal position when changing to the operating configuration, or pivoting the pivoting swing arms 98A and 98B inwards towards the pivotally coupled wing sections 14A, 14B, 16A, 16B, 18A, and 18B when changing to the transport configuration or pivoting the pivoting swing arms 98A and 98B forwards towards the forward end 20A of the pull hitch tube 20 when changing to the operating configuration, a hydraulic system with at least one interlock may be provided. The at least one interlock prevents pivoting inwards of the pivoting swing arms 98A and 98B unless the plurality of wing front shank frames 66A, 66B, 66C, 66D, 66E, and 66F are in their generally vertical positions, and prevents the forward folding of the pivotally coupled wing sections 14B, 16A, 16B, 18A, and 18B unless the pivoting swing arms 98A and 98B are folded inwards.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
   a main frame section including a pull hitch tube extending in a travel direction, said pull hitch tube having a forward end and a rearward end;
   at least one wing section pivotally coupled with said main frame section about at least one generally vertical axis located at said rearward end of said pull hitch tube, said at least one pivotally coupled wing section operable to pivot forward about said at least one generally vertical axis to a position adjacent to and generally parallel with said pull hitch tube when in a transport configuration, said at least one pivotally coupled wing section operable to pivot outward about said at least one generally vertical axis to a position perpendicular to said pull hitch tube when in an operating configuration;
   at least one wing front shank frame pivotally attached to said at least one pivotally coupled wing section, said at least one wing front shank frame operable to pivot to a generally vertical position when in said transport configuration and operable to pivot to a generally horizontal position when in said operating configuration;
   at least one stand-off bracket attached to said at least one pivotally coupled wing section and extending perpendicularly from said at least one pivotally coupled wing section in a forward direction when said at least one pivotally coupled wing section is in said position perpendicular to said pull hitch tube in said operating configuration, and extending perpendicularly from said at least one pivotally coupled wing section in a laterally inward direction when said at least one pivotally coupled wing section is in said position adjacent to and generally parallel with said pull hitch tube in said transport configuration;
   at least one pivoting swing arm being pivotally connected with said at least one stand-off bracket, said at least one pivoting swing arm being operable to pivot inward towards said at least one pivotally coupled wing section when in said transport configuration and to pivot forward towards said forward end of said pull hitch tube when in said operating configuration;
   at least one draft member being coupled between said at least one pivoting swing arm and said forward end of said pull hitch tube; and
   a controller for controlling said at least one pivotally coupled wing section, said at least one wing front shank frame, and said at least one pivoting swing arm, said controller operable to reconfigure the agricultural tillage implement from said operating configuration to said transport configuration by a folding sequence of steps, said folding sequence of steps comprising:
      a first step of pivoting said at least one wing front shank frame to said generally vertical position;
      a second step of pivoting said at least one pivoting swing arm inwards towards said at least one wing section; and
      a third step of pivoting said at least one pivotally coupled wing section forward about said at least one generally vertical axis to said position adjacent to and generally parallel with said pull hitch tube.

2. The agricultural tillage implement of claim 1, further comprising:
   a tool bar attached to and extending transverse to said pull hitch tube;
   a main shank frame pivotally coupled with said tool bar, said main shank frame operable to pivot up and over said tool bar when in said transport configuration, said main shank frame further operable to pivot down and forward of said tool bar when in said operating configuration;
   said pull hitch tube further comprising a telescoping pull hitch tube;
   said controller further operable to pivot said main shank frame up and over said tool bar during said first step of said folding sequence of steps; and
   said controller further operable to extend said telescoping pull hitch tube during said third step of said folding sequence of steps.

3. The agricultural tillage implement of claim 1, wherein:
   said controller is further operable to reconfigure the agricultural tillage implement from said transport configuration to said operating configuration by an unfolding sequence of steps, said unfolding sequence of steps comprising:
      a first step of pivoting said at least one pivotally coupled wing section about said at least one generally vertical axis to said position perpendicular to said pull hitch tube;
      a second step of pivoting said at least one pivoting swing arm forward towards said forward end of said pull hitch tube; and
      a third step of pivoting said at least one wing front shank frame to said generally horizontal position.

4. The agricultural tillage implement of claim 3, further comprising:
   a tool bar attached to and extending transverse to said pull hitch tube;
   a main shank frame pivotally coupled with said tool bar, said main shank frame operable to pivot up and over said tool bar when in said transport configuration, said main shank frame further operable to pivot down and forward of said tool bar when in said operating configuration;
said pull hitch tube further comprising a telescoping pull hitch tube;
said controller further operable to contract said telescoping pull hitch tube during said first step of said unfolding sequence of steps; and
said controller further operable to pivot said main shank frame down and forward of said tool bar during said third step of said unfolding sequence of steps.

5. The agricultural tillage implement of claim 1, wherein:
said controller further comprises a sequence screen, said sequence screen presenting an operator of the agricultural tillage implement said folding sequence of steps, each of said folding sequence of steps being available for selection by said operator upon completion of the previous step.

6. The agricultural tillage implement of claim 1, wherein:
said controller further comprises an automated control device, said automated control device initiating each of said folding sequence of steps in order upon completion of the previous step.

7. The agricultural tillage implement of claim 1, wherein:
said at least one pivoting swing arm further comprises a bell crank arrangement, having a center pivot connected with said at least one stand-off bracket, a second pivot connected with said at least one draft member, and a third pivot connected with at least one pivoting swing arm hydraulic cylinder, said at least one pivoting swing arm hydraulic cylinder being further connected to said at least one pivotally coupled wing section.

8. The agricultural tillage implement of claim 7, wherein:
said at least one pivoting swing arm hydraulic cylinder is connected to said at least one pivotally coupled wing section at a location laterally outward from said stand-off bracket along said at least one pivotally coupled wing section when said at least one pivotally coupled wing section is in said position perpendicular to said pull hitch tube in said operating configuration, said at least one pivoting swing arm hydraulic cylinder being operable to pull said at least one pivoting swing arm third pivot outwards causing said at least one pivoting swing arm to pivot about said center pivot and causing said second pivot connected with said at least one draft member to pivot inwards towards said at least one pivotally coupled wing section.

9. The agricultural tillage implement of claim 7, wherein:
said at least one pivoting swing arm hydraulic cylinder is connected to said at least one pivotally coupled wing section at a location laterally inward from said stand-off bracket along said at least one pivotally coupled wing section when said at least one pivotally coupled wing section is in said position perpendicular to said pull hitch tube in said operating configuration, said at least one pivoting swing arm hydraulic cylinder being operable to push said at least one pivoting swing arm third pivot outwards causing said at least one pivoting swing arm to pivot about said center pivot and causing said second pivot connected with said at least one draft member to pivot inwards towards said at least one pivotally coupled wing section.

10. The agricultural tillage implement of claim 1, wherein:
said at least one pivotally coupled wing section further comprises at least one left pivotally coupled wing section and at least one right pivotally coupled wing section;
said at least one generally vertical axis further comprises a left generally vertical axis and a right generally vertical axis;
said at least one wing front shank frame further comprises at least one left wing front shank frame and at least one right wing front shank frame;
said at least one stand-off bracket further comprises a left stand-off bracket and a right stand-off bracket;
said at least one pivoting swing arm further comprises a left pivoting swing arm and a right pivoting swing arm; and
said at least one draft member further comprises a left draft member and a right draft member.

11. A draft linkage assembly for an agricultural tillage implement, the agricultural tillage implement having a main frame section including a pull hitch tube extending in a travel direction, at least one wing section pivotally coupled with the main frame section about at least one generally vertical axis located at a rearward end of the pull hitch tube and operable to pivot forward about the at least one generally vertical axis to a position adjacent to and generally parallel with the pull hitch tube when in a transport configuration, and further operable to pivot outward about the at least one generally vertical axis to a position perpendicular to the pull hitch tube when in an operating configuration, and at least one wing front shank frame pivotally attached to the at least one pivotally coupled wing section and operable to pivot between a generally vertical position and a generally horizontal position, the draft linkage assembly comprising:
at least one stand-off bracket attached to the at least one pivotally coupled wing section and extending perpendicularly from the at least one pivotally coupled wing section in a forward direction when the at least one pivotally coupled wing section is in a position perpendicular to the pull hitch tube in the operating configuration, and extending perpendicularly from the at least one pivotally coupled wing section in a laterally inward direction when the at least one pivotally coupled wing section is in the position adjacent to and generally parallel with the pull hitch tube in the transport configuration;
at least one pivoting swing arm being pivotally connected with said at least one stand-off bracket, said at least one pivoting swing arm being operable to pivot inward towards the at least one pivotally coupled wing section when in the transport configuration and to pivot forward towards a forward end of the pull hitch tube when in the operating configuration;
at least one draft member being coupled between said at least one pivoting swing arm and said forward end of the pull hitch tube; and
a controller for controlling said draft linkage assembly, said controller operable to reconfigure the agricultural tillage implement from the operating configuration to the transport configuration by a folding sequence of steps, said folding sequence of steps comprising:
determining that the at least one wing front shank frame is in the generally vertical position;
pivoting said at least one pivoting swing arm inwards towards the at least one wing section;
allowing the at least one pivotally coupled wing section to pivot forward about the at least one generally vertical axis to the position adjacent to and generally parallel with the pull hitch tube.

12. The draft linkage assembly of claim 11, wherein:
said controller is further operable to reconfigure the agricultural tillage implement from the transport configuration to the operating configuration by an unfolding sequence of steps, said unfolding sequence of steps comprising:
determining that the at least one pivotally coupled wing section is pivoted about the at least one generally vertical axis to the position perpendicular to the pull hitch tube;
pivoting said at least one pivoting swing arm forward towards said forward end of the pull hitch tube; and
allowing the at least one wing front shank frame to pivot to the generally horizontal position.

13. The agricultural tillage implement of claim 11, wherein:
said controller further comprises a sequence screen, said sequence screen presenting an operator of the agricultural tillage implement said folding sequence of steps, each of said folding sequence of steps being available for selection by said operator upon completion of the previous step.

14. The agricultural tillage implement of claim 11, wherein:
said controller further comprises an automated control device, said automated control device initiating each of said folding sequence of steps in order upon completion of the previous step.

15. The draft linkage assembly for an agricultural tillage implement of claim 11, wherein:
said at least one pivoting swing arm further comprises a bell crank arrangement, having a center pivot connected with said at least one stand-off bracket, a second pivot connected with said at least one draft member, and a third pivot connected with at least one pivoting swing arm hydraulic cylinder, said at least one pivoting swing arm hydraulic cylinder being further connected to the at least one pivotally coupled wing section.

16. The agricultural tillage implement of claim 15, wherein:
said at least one pivoting swing arm hydraulic cylinder is connected to the at least one pivotally coupled wing section at a location laterally outward from said stand-off bracket along the at least one pivotally coupled wing section when the at least one pivotally coupled wing section is in the position perpendicular to the pull hitch tube in the operating configuration, said at least one pivoting swing arm hydraulic cylinder being operable to pull said at least one pivoting swing arm third pivot outwards causing said at least one pivoting swing arm to pivot about said center pivot and causing said second pivot connected with said at least one draft member to pivot inwards towards the at least one pivotally coupled wing section.

17. The agricultural tillage implement of claim 15, wherein:
said at least one pivoting swing arm hydraulic cylinder is connected to the at least one pivotally coupled wing section at a location laterally inward from said stand-off bracket along the at least one pivotally coupled wing section when the at least one pivotally coupled wing section is in the position perpendicular to the pull hitch tube in the operating configuration, said at least one pivoting swing arm hydraulic cylinder being operable to push said at least one pivoting swing arm third pivot outwards causing said at least one pivoting swing arm to pivot about said center pivot and causing said second pivot connected with said at least one draft member to pivot inwards towards the at least one pivotally coupled wing section.

18. The draft linkage assembly for an agricultural tillage implement of claim 11, wherein:
said at least one stand-off bracket further comprises a left stand-off bracket and a right stand-off bracket;
said at least one pivoting swing arm further comprises a left pivoting swing arm and a right pivoting swing arm; and
said at least one draft member further comprises a left draft member and a right draft member.

19. A method of reconfiguring an agricultural tillage implement from an operating configuration to a transport configuration comprising the steps of:
pivoting at least one wing front shank frame to a generally vertical position, said at least one wing front shank frame being pivotally coupled with at least one pivotally coupled wing section and being operable to pivot to said generally vertical position when in a transport configuration and operable to pivot to a generally horizontal position when in an operating configuration, said at least one pivotally coupled wing section being pivotally coupled with a main frame section of the agricultural tillage implement about at least one generally vertical axis and being operable to pivot forward about said at least one generally vertical axis to a position adjacent to and generally parallel with a telescoping pull hitch tube attached to said main frame section when in said transport configuration, said at least one pivotally coupled wing section further operable to pivot outward about said at least one generally vertical axis to a position perpendicular to said telescoping pull hitch tube when in said operating configuration;
pivoting at least one pivoting swing arm inwards towards said at least one pivotally coupled wing section, said at least one pivoting swing arm being pivotally connected with at least one stand-off bracket, said at least one stand-off bracket being attached to said at least one pivotally coupled wing section and extending perpendicularly from said at least one pivotally coupled wing section in a forward direction when said at least one pivotally coupled wing section is in said position perpendicular to said telescoping pull hitch tube in said operating configuration, and extending perpendicularly from said at least one pivotally coupled wing section in a laterally inward direction when said at least one pivotally coupled wing section is in said position adjacent to and generally parallel with said telescoping pull hitch tube in said transport configuration, said pivoting swing arm being further pivotally connected with at least one draft member, said at least one draft member being further pivotally connected with a forward end of said telescoping pull hitch tube; and
pivoting said at least one pivotally coupled wing section forward about said at least one generally vertical axis to said position adjacent to and generally parallel with said telescoping pull hitch tube.

20. The method of reconfiguring an agricultural tillage implement from an operating configuration to a transport configuration of claim 15, further comprising:
pivoting a main shank frame up and over a tool bar while pivoting said at least one wing front shank frame to said generally vertical position, said main shank frame being pivotally attached to said tool bar, said tool bar being attached to and extending transverse to said telescoping pull hitch tube of said main frame section;

extending said telescoping pull hitch tube while pivoting said at least one pivotally coupled wing section forward about said at least one generally vertical axis to said position adjacent to and generally parallel with said telescoping pull hitch tube.

\* \* \* \* \*